May 27, 1952 H. C. SWAY 2,598,081
ELECTRIC BLANKET CONTROL
Filed Jan. 2, 1948 3 Sheets-Sheet 1

Inventor:
Henry C. Sway,
by Alfred V. Robst.
His Attorney.

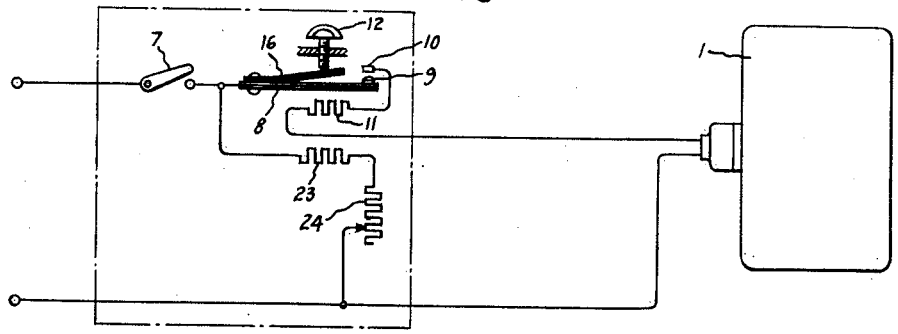
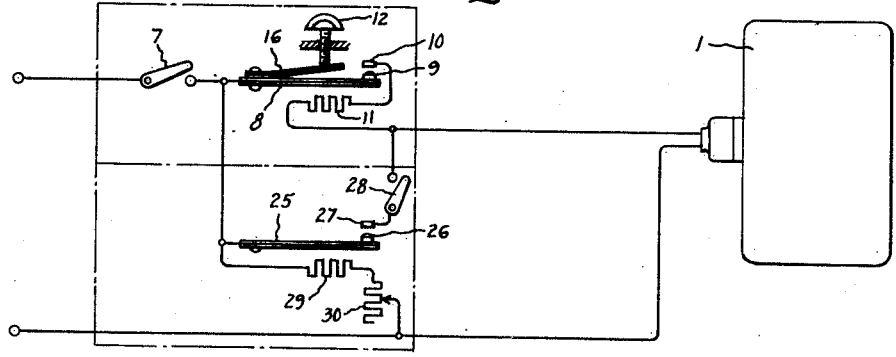
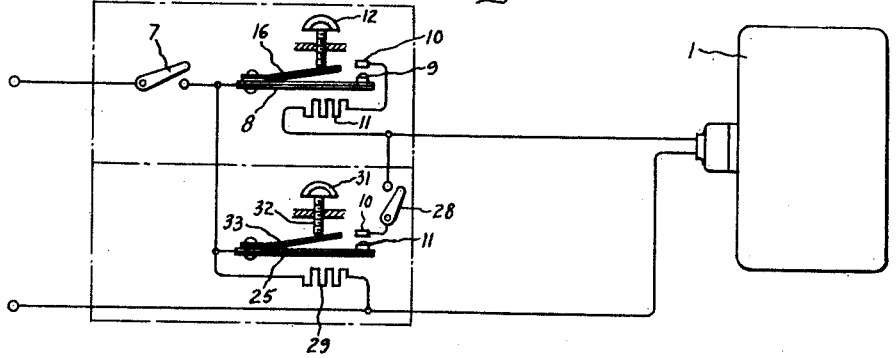

Patented May 27, 1952

2,598,081

UNITED STATES PATENT OFFICE 2,598,081

ELECTRIC BLANKET CONTROL

Henry C. Sway, Bridgeport, Conn., assignor to General Electric Company, a corporation of New York Application January 2, 1948, Serial No. 69

2 Claims. (Cl. 219—46)

The present invention relates to controls for electric blankets and similar heating devices.

Various arrangements have heretofore been proposed for controlling the supply of heating current to an electric blanket or the like. Some of these controls depend upon the temperature of the blanket in the vicinity of the heating wire, or the temperature of the heating wire itself or upon the ambient temperature, or combinations of these, the blanket heating circuit being turned on and off by the control to maintain the desired temperature condition. The present invention is applicable to any of such controls and has for its object the provision of means for automatically providing an extended initial heating period at full blanket current for prewarming the bed before use.

Figure 1:
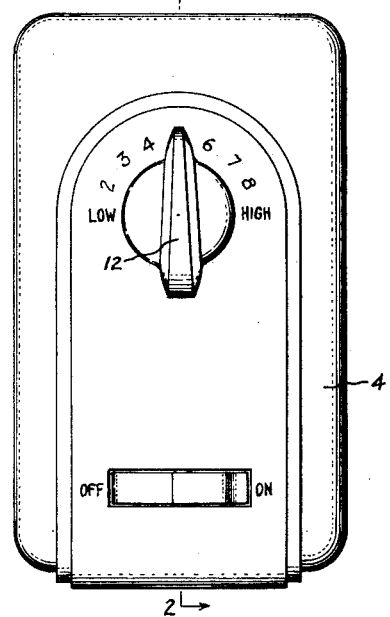
Figure 2:
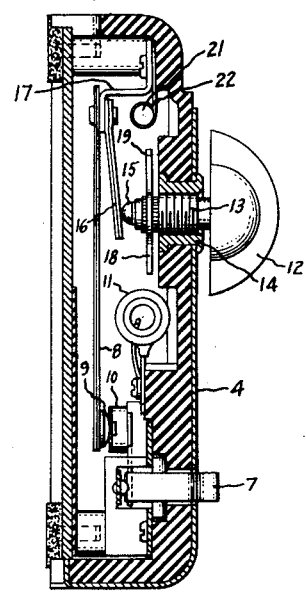
Figure 3:
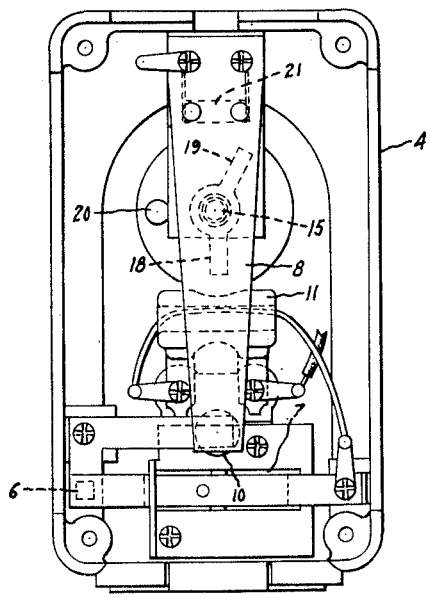
Figure 4:
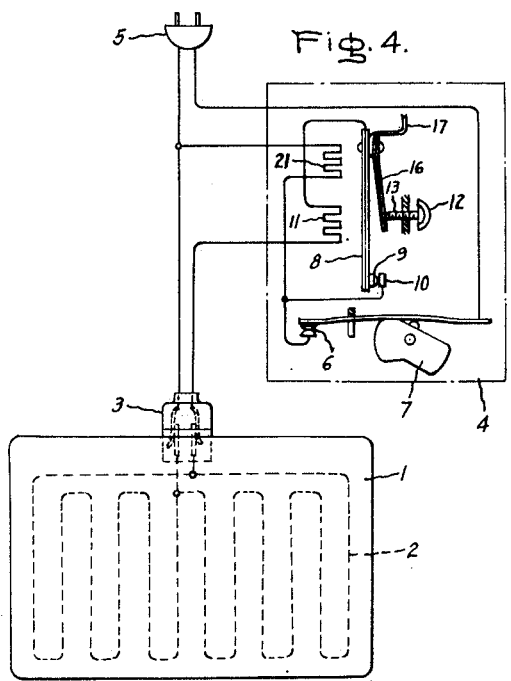
Figure 8:
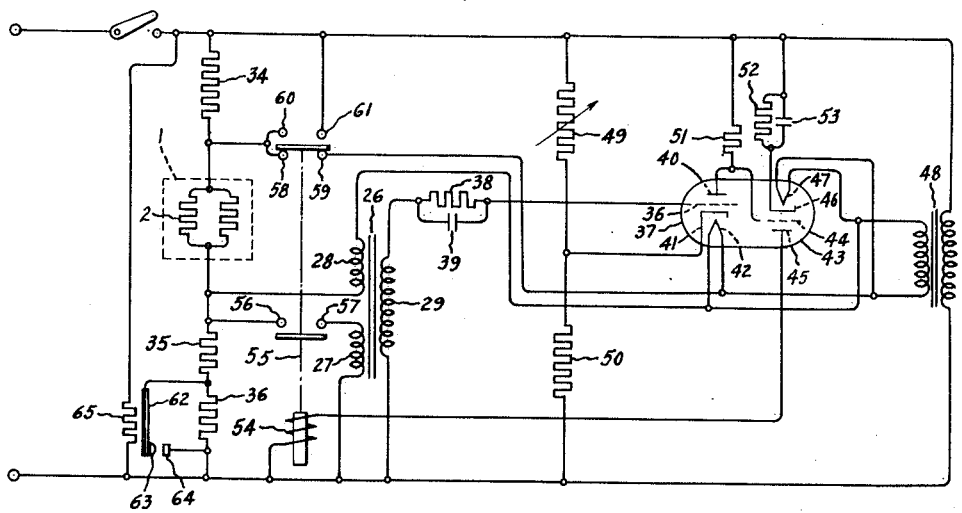

This and other objects of the invention and suitable arrangements for carrying out the same will best be understood from the following description taken in connection with the accompanying drawings in which Fig. 1 is a plan view of a control device suitable for use in one modification of my invention; Fig. 2 is a section taken along the line 2—2 in Fig. 1; Fig. 3 is a bottom plan view of the device shown in Figs. 1 and 2; Fig. 4 is a schematic wiring diagram showing the connections of the said device to an electric blanket; Fig. 5 is a schematic wiring diagram of a modified control circuit; Figs. 6 and 7 are schematic wiring diagrams of further modifications; and Fig. 8 is a schematic wiring diagram showing the application of my invention to a different type of heating control arrangement.

Prewarming of a bed before use is particularly desirable where the bedroom in which the blanket is to be used is inadequately heated for reasons of preference or economy. Adequate prewarming requires raising the temperature of the mattress, sheets, and blanket from an uncomfortably low temperature to one more compatible with the human body. It is obvious that some prewarming can be accomplished by turning on conventional blanket controls for some time before retiring. This, however, is not entirely satisfactory due to the difference in thermal mass of the empty bed compared to the condition when at least one person is under the blanket. That is, the blanket control is usually arranged to provide only the heat which normally is lost by a sleeper under the blanket. This amount of heat is insufficient to raise the bed temperature significantly. The sleeper himself, must, therefore, provide the initial heat required to raise the bed temperature to the body temperature.

According to the present invention, control arrangements are provided whereby the blanket will supply a steady amount of heat corresponding to its maximum rated capacity for a preheating period sufficient to raise the bed temperature to a comfortable degree, having regard to the existing ambient temperature and the degree of heat desired by the sleeper.

Referring now to Figs. 1 to 4 of the drawings, there is illustrated a modification of my invention as applied to an ambient temperature responsive cycling control of the type heretofore described in, for example, United States Patents Nos. 2,195,958 to W. K. Kearsley and 2,383,291 to L. W. Cook, both of which are assigned to the same assignee as the present application. A schematic wiring diagram is shown in Fig. 4 in which a blanket body 1 is provided with a heating circuit 2 which may consist, as shown, of two parallelly connected wires distributed over the blanket area. The blanket heating circuit is connected by means of a separable plug 3 to a control device 4. The whole arrangement may be supplied with power through a connection plug 5.

Mechanical arrangements of the control device 4 are shown in Figs. 1 to 3. The device 4 includes switch contacts 6 manually operable by switch lever 7. A bimetallic thermostatic element or bi-metal 8 carries at its end a contact 9 which cooperates with a stationary contact 10. The operation of the element 8 is responsive not only to ambient temperature but also to heat produced by a heater 11. Switch contact 6, thermostat contacts 9, 10, the thermostatic element 8, and heater 11 are all connected in series with the blanket heating circuit 2 and across the line terminals represented by the plug 5.

The temperature at which the element 8 opens and closes its contacts is controllable by the user through a predetermined range by means of a rotatable heat selector knob 12. Rotation of the knobs 12 varies the axial position of a worm or screw 13 which is journaled in a nut 14 fixed to the housing 4. The inner end of the worm carrying shaft terminates in a ball 15 which bears against a spring tensioned lever 16, the other end of which is fastened together with the thermostatic element 8 to a bracket 17 which is also supported by the housing 4. A washer having outwardly extending arms 18 and 19 is fastened to the worm 13 and rotates with it. The arms are positioned to engage a stop 20 whereby the amount of rotation of the knob 12 is limited.

As so far described, the control is conventional and operates substantially in the same manner as controls previously described in the art, for example, in the Kearsley and Cook Patents above referred to. Such operation is as follows: With the plug 5 connected to a source of power and the switch 7 turned on so that contacts 6 are closed, contacts 9, 10 will be closed, assuming that the ambient temperature is sufficiently low, thereby energizing the blanket heating circuit 2 and the thermostat heater 11. As the heater 11 raises the temperature within the housing 4, the element 8 will open contacts 9, 10 and thereby the blanket heating circuit, permitting the heater 11 as well as the blanket 1 to cool down, whereupon contacts 9, 10 will again close. An on-off cycling effect thus takes place. The duration of the on-off periods is dependent upon the calibration of the thermostatic element 8, the ambient temperature surrounding the control unit 4 and the setting of the heat selector knob 12.

For such normal prior art operation, the bi-metal element 8 may be chosen or precalibrated to close contacts 9, 10 at, say, 70° F. Thus if the room temperature drops below 70° F., contacts 9, 10 being closed, the blanket and heater begin to warm up. When the bi-metal temperature rises a degree or two, the contacts will open whereby the current is interrupted, causing the bi-metal, the heater and the blanket to cool. The speed of cooling and heating is thus dependent upon the ambient air temperature. The value of the resistance of heater 11 and therefore its power dissipation is usually chosen so that the contacts 9, 10 remain closed at an ambient temperature below 45° F. which has been found to be the lower limit of the comfort zone with a 180 watt blanket.

If the attempt be made to use such a conventional control for prewarming the bed by merely turning the control on a given period before retiring, it will be found that the bed does not warm up sufficiently because the control begins to cycle too soon. In other words, the length of the "on" periods are only sufficient to compensate for the heat lost by the sleeper under the given conditions of ambient temperature and degree of heat selected by the selector knob 12.

According to the present invention, I provide an additional heating element 21 for the thermostatic element 8 and change the calibration of element 8 so that, with the midway setting of selector knob 12, the element 8 will open contacts 9, 10 only at a considerably higher temperature, say, 85° F. instead of 70° F. The auxiliary resistor 21 may conveniently be mounted in the control box by means of a surrounding metal clip 22 in thermal contact with the bracket 17 by which it may be secured to the housing 4 as illustrated in Fig. 2. The resistor 21 is connected across the line terminals 5 in series with switch contacts 6. The resistor 21 preferably has a high resistance and low wattage value, for example, 30,000 ohms for 115 volt operation and has a relatively large thermal mass. The heat which it develops is conducted to the element 8 through a devious path, for example, through the bracket 17. Thus there is provided between resistor 21 and the bimetallic element 8 a heat carrier through which the heat generated by resistor 21 must travel to reach element 8 which means that some time is required for the heat generated by resistor 21 to reach element 8.

In the operation of this arrangement, the combined heat of the auxiliary resistor 21 and the heater 11 warms the bi-metal 8 to the opening temperature. When this temperature is reached, contacts 9, 10 open, turning off the power to both blanket and heater 11, but leaving the auxiliary resistor 21 across the line. With contacts 9, 10 open, the bi-metal and the blanket begin to cool. The heat from the resistor 21 is insufficient by itself to keep the contacts open. The amount of heat supplied by the resistor 21 just compensates for the 15° higher thermostat opening temperature. That is, the resistance value of the auxiliary heater 21 is chosen to maintain the temperature inside the housing 4 at the operating temperature level for which the bimetallic element has been calibrated. In other words, after element 8 has once reached its elevated opening temperature, it will continue to open and close at rates dependent entirely upon the ambient temperature and the setting of heat selector knob 12. It will, therefore, supply to the blanket an amount of heat which again is substantially equal to the heat loss of the sleeper. Until such normal cycling operation begins, however, contacts 9, 10 will have remained closed and the blanket will have been energized for an extended period to provide initial prewarming of the bed.

A modified circuit arrangement is illustrated in Fig. 5. The arrangement here is the same as in Fig. 4 except that the prewarming resistor 21 of Fig. 4 has been replaced by two series resistors 23 and 24, of which the latter is adjustable. The addition of the adjustable element 24 enables the user to vary the prewarming period above or below the nominal arbitrarily selected period for which the arrangement of Fig. 4 was calibrated.

A further modification is shown in Fig. 6. In this figure the customary bimetallic element 8 with associated heater 11 is connected in series with the blanket. In shunt with this combination is a preheat or auxiliary bimetallic element or bi-metal 25 having contacts 26 and 27 in series with a control switch 28. A separate heater for bi-metal 25 is provided at 29, having a series adjustable portion 30. The heater 29 and resistance 30 are connected directly across the line terminals after the main control switch 7. The auxiliary bi-metal 25 with its heater 29 may be mounted in the same housing with the main bi-metal 8 and its series heater but it should be thermally isolated from it. The preheat bi-metal 25 is calibrated to open its contacts 26, 27 at a temperature somewhat higher than that of the main bi-metal 8; for example the auxiliary bi-metal 25 may be adjusted to open its contacts at 85° to 90° F. whereas the bi-metal 8 is calibrated to open its contacts 9, 10 at 70° F.

With this arrangement the auxiliary bi-metal 25 will initially have its contacts 26, 27 closed and will supply energy to the blanket 1 even though the main bi-metal 8 is open, since the latter is short circuited. Current will thus be supplied to the blanket over such a time as is necessary for the prewarmer resistor 29 to raise the temperature of bi-metal 25 to the contact opening point. When the contacts open, the blanket current then flows through its normal channel, that is, through the main bi-metal 8 and series heater 11. The bi-metal 25 thereafter will be maintained in "open" position since the heater 29 continually supplies sufficient power for this purpose. Thus the preheat bi-metal 25 returns the control to the normal operation of the main thermostatic element 8 after a given time determined by the initial room temperature, the calibrated thermostat opening temperature, and the thermal mass of both the bi-metal 25 and the pre-warmer heater.

The switch 28 is optional. However, by providing this switch the user has the opportunity to discontinue the preheat cycle at any time. This is particularly advantageous in the event that the control had not been turned on a sufficiently long time prior to retiring to allow for a complete prewarming cycle. If the sleeper retired before the end of the prewarming cycle, he would be much too warm during the remainder of the prewarming period before normal operation of the thermostat begins.

The rheostat 30 similarly is an optional feature, but its use in the circuit makes it possible for the user to vary the length of the prewarming cycle. By adjusting the resistance 30, the current through the heater 29 can be varied, thereby varying the time required to bring the bi-metal 25 to opening temperature.

A still further modification of my invention is shown in Fig. 7. This is similar to Fig. 6 except that the auxiliary bi-metal 25 is provided with a calibration changing mechanism having the knob 31 controlling a screw 32 which bears against a spring tensioned plate 33 mechanically fixed to the bi-metal 25. This device may be mechanically constructed in the same manner as the main bi-metal control described with reference to Figs. 1 to 3. It should, however, together with the associated heater 29 be mounted in a separate compartment to provide thermal isolation from the main bi-metal 8 and its heater 11. By varying the position of control knob 31, the length of the preheat period may be varied by the user. Otherwise this arrangement operates similarly to the arrangement of Fig. 6. As in Fig. 6, the switch 28 in Fig. 7 may be omitted if desired. Preferably, however, the switch 28 may be mechanically combined with the control knob 31 so that the switch will be opened when the knob 31 is turned just beyond its shortest preheat time position.

From the previously described arrangements of my invention it will be evident that my invention can be applied in a number of ways. The previously described modifications relate particularly to simple ambient temperature responsive "cycling" controls. However, my invention is equally applicable to other arrangements including electronic controls. For such other arrangements my invention can readily be adapted to provide a time delay circuit which will cause the blanket or other heating device to operate at full power for a given length of time, preferably for a time dependent upon the ambient temperature. For such controls, the contacts of the prewarming thermostat can be made to shunt or to supersede the controlling contacts in the particular control involved. The prewarming thermostat can, of course, be connected in a number of ways depending upon the design of the circuit. It may, for example, be connected directly across the main controlling relay contacts or across the main controlling circuit. In the low voltage transformer type of heating circuits, the prewarming thermostat arrangement can be incorporated in the primary or line voltage side of the transformer.

As an example of the application of my invention to such other types of control arrangements, I have shown in Figure 8 the provision of a prewarming circuit in an electronic control circuit. The circuit used in this example is substantially the same as that described and claimed in the copending application of George C. Crowley, Serial No. 792,971, filed December 20, 1947, now Patent No. 2,501,499, patented March 21, 1950, and assigned to the same assignee as the present application.

In this circuit the blanket body 1 having heating wires 2 is connected across the supply line and supplied with energy with the aid of a relay controlled by an electron tube circuit. The operation of this circuit is dependent upon the temperature of the heating element 2 which is made of a material having high temperature coefficient of resistance so that the resistance of the element 2 is a measure of its temperature.

More specifically, the heating element 2 is connected across the supply line in series with a high resistance 34 which is shunted by relay contacts 60 and 61 which are closed when the operating coil 54 of the relay 55 is energized. The heating element 2 is also in series with a low resistance formed in two parts 35 and 36. Control voltages are obtained from the voltage drop across the element 2 and from the voltage drop across the resistances 35 and 36. These voltage drops are impressed across two primaries 27 and 28 of a transformer 26 having a secondary 29 in the grid circuit of a first vacuum tube 37 whose plate current in turn supplies grid voltage to a second, amplifying vacuum tube 43. The plate current of tube 43 controls the energization or deenergization of coil 54 of the relay 55.

In the operation of the circuit so far described, when the heating element 2 is cold and the line switch is closed, transformer secondary 28 is connected by relay contacts 58 and 59 across the heating element 2 in series opposition with a small reference voltage obtained from filament transformer 48. Since the heating element 2 is, under these conditions, in series with the high resistance 34, only a very small current flows through the heating winding. The circuit constants are so adjusted that the difference between the small voltage drop across the element 2, while cold, and the reference voltage is sufficient to produce a current flow in the plate circuit of tube 43, thereby energizing relay coil 54. Contacts 58, 59 thereupon open, deenergizing primary 28, and contacts 60, 61 close, short circuiting high resistance 34 so that the heating element 2 is supplied with full current. At the same time, contacts 56, 57 are closed, connecting primary 27 across both resistances 35, 36.

The voltage drop across these resistances is impressed across primary winding 27. The circuit constants are so adjusted that the grid voltage applied to tube 37 will maintain current flow through both vacuum tubes and through the relay coil 54 so long as heating element 2 is relatively cold. As the element 2 heats up, its resistance increases, decreasing the current flow through it and through resistances 35, 36. When heating element 2 has attained a predetermined temperature, the voltage drop impressed on primary 27 is reduced to such a value that current flow through the vacuum tubes becomes insufficient to maintain energization of relay coil 54, so that the relay opens returning the circuit connections to those existing at the start. After the element 2 cools to a predetermined temperature its resistance will have reduced to such a value that the difference between the voltage drop across it and the reference voltage supplied by transformer 48 will be sufficient to provide a grid voltage for vacuum tube 37 to reestablish sufficient current flow through relay coil 54 again to close the relay. The heating cycle is then repeated. Further details of the operation of this circuit will be found in the previously mentioned Crowley application.

In order to provide for an initial extended prewarming period with full current flowing through the heating circuit, I provide a thermostatic element 62 having movable contact 63 and stationary contact 64 connected in shunt across resistance 36. A heater 65 for the element 62 is connected across the line. At the start contacts 63, 64 are open. After a time, heater resistance 65 supplies sufficient heat to warm the element 62 to cause it to deflect to close contacts 63, 64 and to hold them closed until the entire circuit is deenergized.

Thus, at the start of a heating period when the line switch is first closed, the controlling vacuum tube voltage which determines when the relay 55 shall open is obtained from the voltage drop across combined resistances 35 and 36. In order to reduce the voltage drop across resistances 35 and 36 to a slow enough value to bring about a sufficient reduction in vacuum tube output current to deenergize relay coil 54, it is necessary that the heating element 2 attain a higher temperature and a higher resistance than is the case when contacts 63, 64 are closed.

After the heater resistance 65 has been energized for a period of time and has produced sufficient heat to close contacts 63, 64, the control voltage impressed across transformer secondary 27 will be the voltage drop across resistor 35 alone because resistance 36 is short circuited by the thermostat 62 and its contacts 63, 64. Hence a smaller increase in the resistance of heating element 2 and decrease in the current through it is required to produce an opening of the relay. Therefore, after the contacts 63, 64 have closed, the control circuit functions in its normal manner as above described and as is further detailed in the said Crowley application.

For the purpose of automatically compensating the prewarming time for ambient temperature conditions, the thermostat element 62 is preferably mounted so that it will be thermally isolated from heating element 2 and from any heat produced by vacuum tubes 37 and 43. Thus, when at the start, the room temperature is very low, the heating resistance 65 will be required to supply heat for a longer period of time before thermostat 62 will open its contacts. On the other hand, if at the start the room temperature is relatively high, a shorter prewarming period is automatically provided.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent in the United States is:

1. In combination, an electric blanket having a heating winding, and a control for regulating the flow of electric current through said winding comprising a casing separate from the blanket, a bimetallic thermostatic element mounted in the casing, contacts operated by said element, a main heating winding and an auxiliary heating winding for said bimetallic thermostatic element, heat from both said windings being required to effect normal cycling of the control, a circuit for connecting the blanket heating winding, said main heating winding and said contacts in series to a power supply source, a circuit for connecting said auxiliary heating winding to a power supply source, means mounting said main heating winding in the casing in direct thermal relation to said thermostatic element, and means mounting said auxiliary heating winding in the casing including a heat barrier between such winding and the thermostatic element through which heat from the auxiliary heating winding travels to reach the thermostatic element whereby when the control is turned on initially with said contacts closed, a prewarming period will transpire before normal cycling begins.

2. The combination defined by claim 1 wherein an adjustable resistance is connected in series with the auxiliary heating winding for varying the length of the prewarming period.

HENRY C. SWAY.

REFERENCES CITED

The following references are of record in the file of this patent:

UNITED STATES PATENTS

| Number | Name | Date |
| --- | --- | --- |
| 1,876,636 | Dickie | Sept. 13, 1932 |
| 1,980,756 | Hoover | Nov. 13, 1934 |
| 2,023,113 | Biebel | Dec. 3, 1935 |
| 2,046,718 | Bletz | July 7, 1936 |
| 2,122,650 | Keene | July 5, 1938 |
| 2,195,958 | Kearsley | Apr. 2, 1940 |
| 2,220,061 | Brown | Nov. 5, 1940 |
| 2,294,191 | Lord | Aug. 25, 1942 |
| 2,383,291 | Cook | Aug. 21, 1945 |
| 2,410,013 | Clark | Oct. 29, 1946 |
| 2,421,953 | MacKendrick | June 10, 1947 |
| 2,422,526 | Burch | June 17, 1947 |